United States Patent [19]

Tominaga et al.

[11] 4,287,501
[45] Sep. 1, 1981

[54] PRESSURE SENSOR

[75] Inventors: Tamotsu Tominaga; Teruyoshi Mihara, both of Yokohama; Takeshi Oguro, Yokosuka; Masami Takeuchi, Kokubunji, all of Japan

[73] Assignee: Nissan Motor Company, Limited, Kawagawa, Japan

[21] Appl. No.: 109,484

[22] Filed: Jan. 4, 1980

[30] Foreign Application Priority Data

Jan. 31, 1979 [JP] Japan .............................. 54-10009[U]

[51] Int. Cl.³ .......................................... H01L 10/10
[52] U.S. Cl. ...................................... 338/42; 73/720; 338/4
[58] Field of Search ....................................... 338/2-5, 338/42, 36; 357/26; 73/720, 721, 726, 727; 29/610 SG

[56] References Cited

U.S. PATENT DOCUMENTS 3,748,623  7/1973  Miller ..................................... 338/4
4,131,088  12/1978  Reddy ................................. 338/4 X
4,168,630  9/1979  Shirouzu et al. ..................... 73/727

FOREIGN PATENT DOCUMENTS 1248087  9/1971  United Kingdom .

Primary Examiner—C. L. Albritton
Attorney, Agent, or Firm—Schwartz, Jeffery, Schwaab, Mack, Blumenthal & Koch

[57] ABSTRACT

A pair of semiconductor diaphragm blocks, each having a diaphragm on a front surface of which a diffused resistor is formed as a pressure-sensitive element, and a circumferential support integral therewith, are confined within a sealed hollow package and bonded at their circumferential supports to opposite inside surfaces of the package such that the front surfaces of the diaphragms are positioned within a vacuum space within the package. This package is provided with through holes through which fluid pressures subject to measurement are introduced so as to arrive at the back surfaces of the diaphragms.

5 Claims, 5 Drawing Figures

PRESSURE SENSOR

BACKGROUND OF THE INVENTION

The present invention relates to a differential pressure sensor using the piezoresistivity effect, and more particularly to a differential pressure sensor that has a diaphragm on which a diffused resistor is formed as a pressure-sensitive element and to which a fluid pressure subject to measurement is introduced.

One conventional semiconductor differential sensor includes two absolute pressure sensor units each having a diaphragm, to which fluid pressures are applied for measurement, and a device for determining the difference between the absolute pressure outputs of the two sensor units. Another conventional semiconductor differential sensor is the type having a diaphragm to opposite surfaces of which fluid pressures subject to measurement are applied to produce an output representative of the difference between the two applied fluid pressures.

In FIG. 1 of the accompanying drawings is shown an absolute pressure sensor unit of the former type, generally designated by 10. This sensor unit includes a diaphragm block 12 having a diaphragm 14 and made of a silicon chip on the front surface 16 of which diffused resistors 18 are formed while the opposite or back surface 20 of the diaphragm is subject to the fluid pressure to be measured. The diaphragm block 12 is bonded to an alumina base 22 by means of a bonding layer 24 and covered by a cap 26 secured to the base 22 such that the front surface 16 of the diaphragm 14 on which the diffused layers 18 are formed is positioned within a vacuum chamber 28 formed by the base 22 and the cap 26. The base 22 has a hole 30 formed therethrough communicating with an inlet pipe 32 connected to the outside surface of the base. When a fluid pressure is introduced through the inlet pipe 32 and the hole 30 to back 20 of the diaphragm 14, the introduced pressure is converted to a corresponding electrical signal according to the stress-resistance characteristics of the diffused resistors 18. Accordingly, if two fluid pressures are introduced so as to arrive at the respective diaphragms 14 of two such sensor units, these sensor units will produce corresponding outputs from which the pressure difference can be obtained. However, use of two sensor units in this way leads to making the sensor necessarily bulky.

FIG. 2 shows one example of the latter differential sensor which has a single diaphragm 14 and which is structurally the same as the sensor of FIG. 1 except that it has an inlet pipe 34 connected to a through hole in the cap 26 through which another fluid pressure is introduced to the front 16 of the diaphragm 14. When two fluid pressures $P_1$ and $P_2$ are introduced through the inlet pipes 32 and 34 to opposite surfaces of the diaphragm 16, the diffused resistors 18 on the diaphragm 16 produce an electrical signal corresponding to the difference between the introduced fluid pressures P1 and P2. This pressure sensor 10 is smaller than the sensor of FIG. 1, but since the diffused resistors 18 are exposed to the fluid of one of the pressures subject to measurement, they are liable to deteriorate due to moisture and corrosive gases which may be contained in the fluid.

SUMMARY OF THE INVENTION

Therefore, it is an object of the present invention to provide a semiconductor differential pressure sensor of a type having a diaphragm which is not exposed to a fluid whose pressure is subject to measurement, thereby resulting in improved durability.

Another object of the present invention is to provide a diaphragm type semiconductor differential pressure sensor which is of a compact structure.

Other objects, features and advantages of the present invention will be apparent from the following description when taken in conjunction with the accompanying drawings.

DETAILED DESCRIPTION OF THE PREFERRED EMBODIMENT

Figure 1:
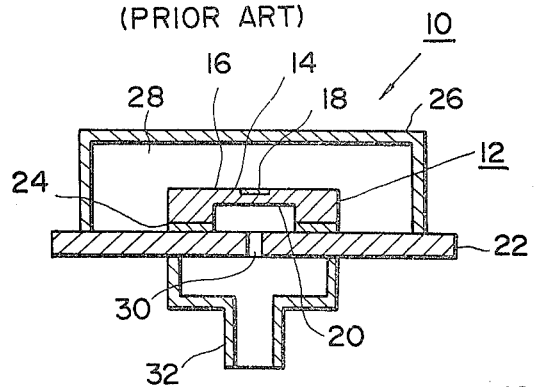
FIG. 1 is a cross-sectional view of a prior art semiconductor differential pressure sensor.
Figure 2:
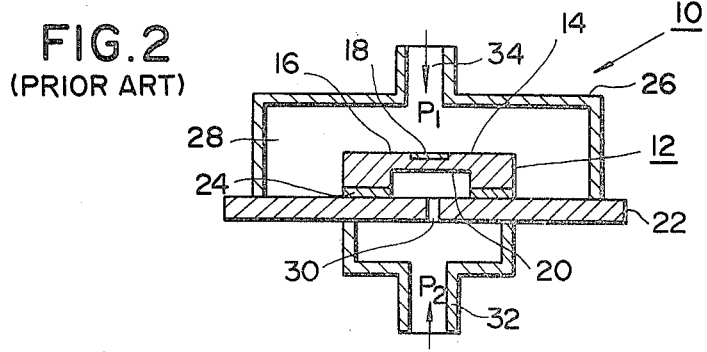
FIG. 2 is a cross-sectional view of another prior art semiconductor differential pressure sensor.

The same reference numeral denotes corresponding parts or members throughout the drawings.

Figure 3:
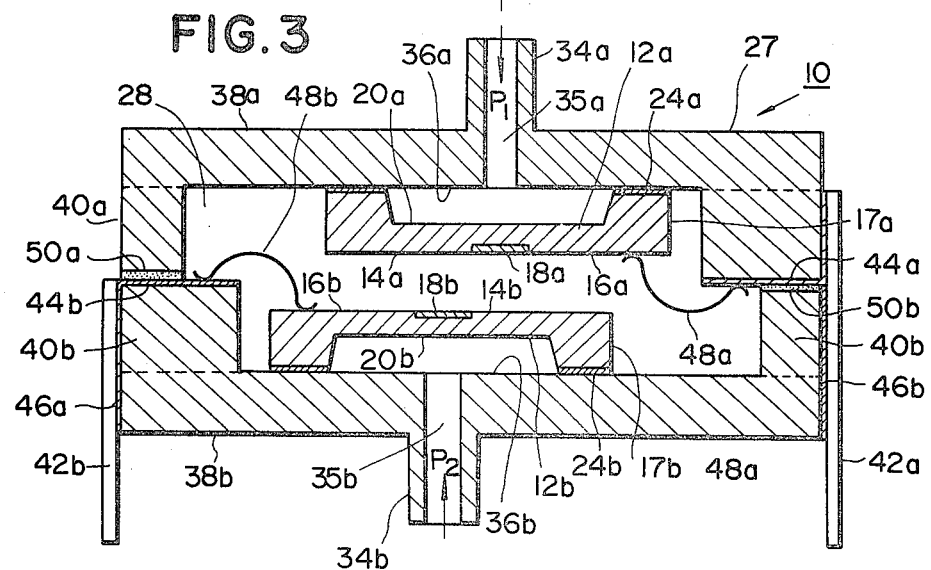
FIG. 3 is a cross-sectional view of the preferred embodiment of a semiconductor differential pressure sensor according to the present invention.
Figure 4:
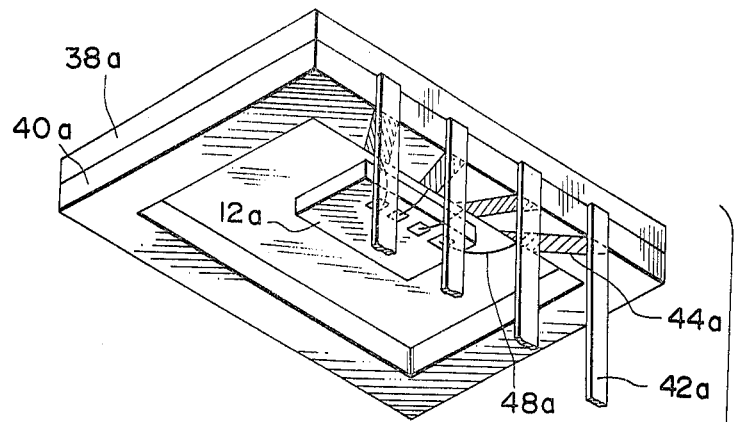
FIG. 4 is an exploded view of the embodiment of FIG. 3.
Figure 4:
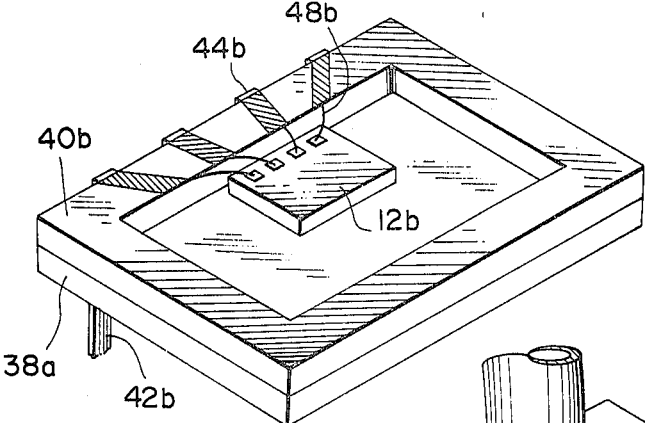
Figure 5:
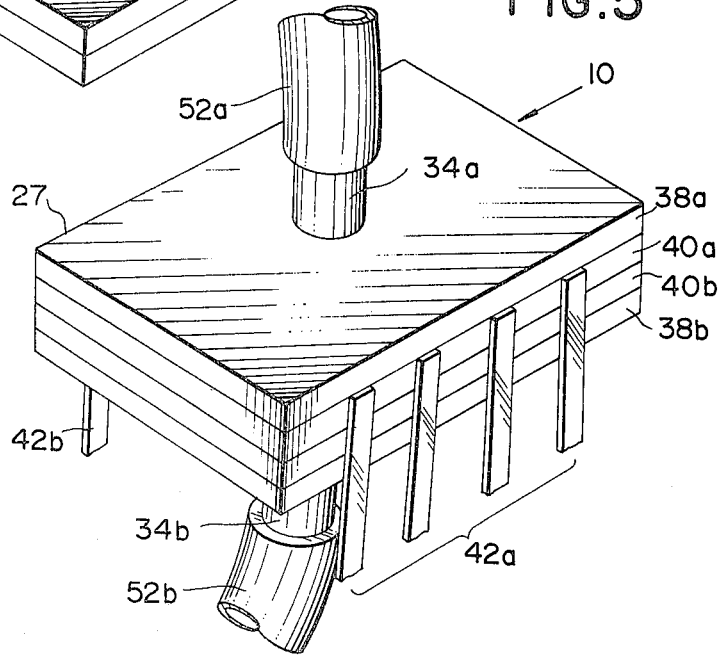
FIG. 5 is a perspective view of the embodiment of FIG. 3.

In FIGS. 3, 4 and 5 is shown a preferred embodiment of a pressure sensor 10 according to the present invention. This sensor 10 includes two semiconductor diaphragm blocks having diaphragms 14a and 14b, obtained by forming diffused resistors 18a and 18b on the front surfaces 16a and 16b of flat silicon chips using known techniques and etching away the opposite surfaces of the chips so as to form the back surfaces 20a and 20b of the diaphragms 14a and 14b to which fluid pressures subject to measurement are introduced, and circumferential supports 17a and 17b. These diaphragm blocks are bonded at their circumferential supports 17a and 17b to opposite inner sides of a box-like package 27 by means of bonding layers 24a and 24b so that the back surfaces 20a and 20b of the diaphragms face the opposite inside surfaces 36a and 36b respectively, of the package. The package 27 consists of two base plates 38a and 38b on which the diaphragm blocks 12a and 12b are mounted, and two circumferential spacers 40a and 40b are also mounted on the corresponding mounting plates 38a and 38b, respectively. The package 27 is provided with a plurality of terminals 42a and 42b connected to opposite sides thereof. The base plate 38a and spacer 40a are connected to each other using a conventional firing technique, and also the base plate 38b and spacer 40b are connected to each other in the same way. In order to prevent thermal stress from being produced in the diaphragms due to thermal change, materials which are of substantially the same linear coefficient of thermal expansion as the silicon chip may be used for the plates and the spacers: for example, mullite, zircon, Pyrex (trademark) glass or the like may be used. The diaphragm blocks 12a and 12b and the corresponding base plates 38a and 38b are joined by bonding layers 24a and 24b each of which may consist of a W (tungsten) or Mo-Mn (molybdenum-manganese) layer metallized on the corresponding base plate 38a or 38b, an Ni (nickel) layer plated thereon and an Au (gold) layer plated on the Ni layer. The Au layers and the corresponding diaphragm blocks form an Au-Si (gold-silicon) eutectic alloy at a temperature of 380° to 400° C. The base plates have inlet pipes 34a and 34b connected to through holes 35a, 35b formed at the respective centers of the plates 38a and 38b through which fluid pressures P1 and P2 are introduced to the respective back surfaces 20a and 20b of the diaphragms. On the spacers 40a and 40b leads 44a and 44b are W (tungsten) or Mo-Mn (molybdenum-manganese) metallized and Au (gold) plated and are electrically connected to the terminals 42a and 42b by means of solder 46a and 46b. The leads 44a and 44b are electrically connected to the diffused resistors 18a and 18b on the diaphragms 14a and 14b through Au (gold) wires 48a and 48b, respectively.

In fabrication, the spacers 40a and 40b are connected to the corresponding base plates 38a and 38b, using a firing technique. The diaphragm blocks 12a and 12b are bonded to the corresponding base plates. The leads and wires 44a, 44b and 48a, 48b are connected to the corresponding terminals 42a and 42b and diffused resistors 18a and 18b, respectively, and to each other. Then, the spacers 40a and 40b are aligned and bonded hermetically to each other by low melting point glass 50a and 50b within a vacuum container, not shown, such that the front surfaces 16a and 16b of the diaphragms on which the diffused resistors are formed are within an evacuated chamber 28 formed by the base plates 38a and 38b and spacers 40a and 40b.

A benifit of the structure of the embodiment described above, is that apart from the orientation of the leads the construction is substantially symmetrical. Thus exactly the same process can be used to manufacture each half of the sensor. Without being restricted to the embodiment described, this feature is widely applicable to the present invention and can provide a valuable saving in manufacturing costs.

When the whole package including the two diaphragm blocks 14a and 14b is mounted on a base, not shown, and the inlet pipes 34a and 34b are connected through hoses 52a and 52b to the two fluid pressures to be compared, the fluid pressures are exerted on the back surfaces 20a and 20b of the diaphragms, and the diffused resistors 18a and 18b produce outputs corresponding to the fluid pressures P1 and P2 to be compared. To obtain the difference between these two outputs results in the measurement of the differential pressure. If, for example, the two pressures are obtained from two different points in a fluid passage, the differential pressure sensor of the present invention can particularly conveniently be used to measure the pressure difference, and then the flow rate can be computed.

Although the invention has been disclosed and described in terms of a preferred embodiment, it will be apparent that other embodiments and modifications of the invention are possible within the scope of the present invention. Thus the scope of letters patent which are here petitioned for is not to be limited by any details of the above described embodiment, nor the appended drawings, but only by the claims which follow.

What is claimed is:

1. A differential pressure sensor comprising:
   two parts which are substantially identical to each other and each of which comprises a half-casing in which is formed at least one aperture adapted to admit a fluid pressure, at least one diaphragm disposed adjacent to one said aperture in such a manner that a fluid pressure introduced through the aperture may be applied to one side of the diaphragm, and at least one diffused resistor formed as a pressure-sensitive element on an inner surface of the diaphragm opposite to the side to which a fluid pressure is applied; and
   connection means for electrically connecting the diffused resistors to an electric circuit;
   wherein the two substantially identical parts are joined together to form a package which is sealed, and which encloses a space which is evacuated.

2. The differential pressure sensor of claim 1 in which each half-casing comprises a substantially flat base plate and a circumferential wall disposed on the same side of the base plate as the inner surface of the diaphragm.

3. The differential pressure sensor of claim 2 in which in each half-casing, said aperture is formed in the base plate.

4. The differential pressure sensor of any of claims 1 to 3 in which the electrical connection means is sandwiched between the two parts.

5. A method of constructing a differential pressure sensor comprising the steps of:
   (a) manufacturing a plurality of substantially identical part units each of which comprises a half-casing in which is formed at least one aperture adapted to admit a fluid pressure, at least one diaphragm disposed adjacent to one said aperture in such a manner that a fluid pressure introduced through the aperture may be applied to one side of the diaphragm, and at least one diffused resistor formed as a pressure-sensitive element on an inner surface of the diaphragm opposite to the side to which a fluid pressure is applied;
   (b) assembling two of the part units facing each other with a connection means for electrical connection to the diffused resistors sandwiched between the two part units so as to form a package enclosing the two diaphragms of the two part units;
   (c) sealing the package; and
   (d) evacuating the package.

* * * * *